United States Patent
Key et al.

(10) Patent No.: US 7,216,937 B2
(45) Date of Patent: May 15, 2007

(54) PRESS-FORMED KEYWAY FOR HEADREST MOUNTING TUBE

(75) Inventors: Arthur A. Key, Kitchener (CA); Jeffrey John Thomas, Toronto (CA); Matthew Richard Gleiser, Waterloo (CA); Alfred D. Napolitano, Jr., Guelph (CA)

(73) Assignee: Bend All Automotive Incorporated, Ayr, Ontario (CA)

( * ) Notice: Subject to any disclaimer, the term of this patent is extended or adjusted under 35 U.S.C. 154(b) by 945 days.

(21) Appl. No.: 10/209,887

(22) Filed: Aug. 2, 2002

(65) Prior Publication Data

US 2004/0021360 A1 Feb. 5, 2004

(51) Int. Cl.
*B60N 2/48* (2006.01)

(52) U.S. Cl. .............................. 297/452.18; 297/452.2; 297/391

(58) Field of Classification Search ............. 297/463.2, 297/463.1, 410, 452.18, 391, 452.2; 403/13, 403/14, 359.6, 365, 375
See application file for complete search history.

(56) References Cited

U.S. PATENT DOCUMENTS

| | | | | |
|---|---|---|---|---|
| 1,836,348 A | * | 12/1931 | Wardell | 403/361 |
| 2,982,586 A | * | 5/1961 | Gliebe | 403/109.3 |
| 3,832,075 A | * | 8/1974 | Arai | 403/328 |
| 4,519,650 A | * | 5/1985 | Terada et al. | 297/452.18 |
| 4,697,947 A | * | 10/1987 | Bauer et al. | 403/14 |
| 4,854,642 A | * | 8/1989 | Vidwans et al. | 297/410 |
| 4,936,702 A | * | 6/1990 | Hsu | 403/316 |
| 5,174,676 A | * | 12/1992 | Welsch et al. | 403/14 |
| 5,397,170 A | * | 3/1995 | Shrock | 297/452.18 |
| 5,676,423 A | * | 10/1997 | Pedronno et al. | 297/378.1 |
| 5,769,499 A | * | 6/1998 | Dudash et al. | 297/452.18 |
| 5,927,813 A | * | 7/1999 | Nemoto | 297/391 |
| 6,035,516 A | * | 3/2000 | Petersen | 29/523 |
| 6,082,823 A | * | 7/2000 | Aumont et al. | 297/452.2 |
| 6,132,003 A | * | 10/2000 | Sakurai et al. | 297/452.18 |
| 6,223,436 B1 | * | 5/2001 | Dudash et al. | 29/897.2 |
| 6,296,316 B1 | * | 10/2001 | Hann | 297/463.1 |
| 6,338,191 B1 | * | 1/2002 | Petersen | 29/523 |
| 6,454,356 B1 | * | 9/2002 | Yamada | 297/410 |

FOREIGN PATENT DOCUMENTS

EP 92472 A1 * 10/1983

\* cited by examiner

*Primary Examiner*—Peter R. Brown
(74) *Attorney, Agent, or Firm*—Anthony Asquith Corp.

(57) ABSTRACT

Headrest-mounting-tubes are attached into the seatframe of an automotive seat. Headrest-posts engage the mounting-tubes, and support the headrest. The headrest-posts need to be orientated correctly, and so have a key that engages a keyway in the mounting-tube. The keyway is formed as a keyway-pocket, being punched from the open end of the tube. Preferably, the keyway-pocket is punched after the mounting-tube has been attached into the seatframe.

8 Claims, 4 Drawing Sheets

PRESS-FORMED KEYWAY FOR HEADREST MOUNTING TUBE

BACKGROUND TO THE INVENTION

This invention relates to headrest-mounting-tubes, for use in connection with automotive seats. Such tubes are shown, for example, in patent publication U.S. Pat. No. 6,035,516 (Petersen, March 2000).

Headrests for vehicle seats have two posts protruding downwards, and these posts engage in headrest-mounting-tubes that are attached to the top-rail of the seatframe. In the past, it has been the common practice to attach the headrest-mounting-tubes to the top-rail by welding.

However, the recent trend is to attach the tubes to the top-rail by a cold-forming method. The top-rail of the seatframe is mounted in a die, and the headrest-mounting-tube is subjected to a punching force exerted in the axial sense relative to the tube, whereby the metal of the tube engages with the top-rail, and crumples and folds, in such manner as to leave the tube firmly secured to the top-rail, as shown in the said U.S. Pat. No. 6,035,516, this manner of securement being termed lock-beading. As will be explained, the present invention is particularly applicable to forming the keyway-pockets in the headrest-mounting-tubes when the headrest-mounting-tubes are secured into the seatframe by lock-beading.

A typical automotive headrest is adjustable, and often the manner of adjustment is such that an adjustment operator is located on the headrest post. In order to make an adjustment, the driver reaches behind his head and operates the adjuster by feel. The designer must make sure that the adjustment operator is presented to the driver always in the same orientation. For this and other reasons, it is a common requirement that the headrest-mounting-tube should have a slot or keyway formed therein, which can be engaged by the adjustment operator associated with the headrest post, to ensure the correct orientation thereof.

The invention concerns the slot or keyway in the headrest-mounting-tube, and the manner in which the same can be formed.

THE INVENTION IN RELATION TO THE PRIOR ART

The metal tubing from which the headrest-mounting-tube is made usually is right-cylindrical, thick-walled, welded-steel, tubing.

When a slot has been required in the tube, it has been the practice to make the slot by stamping the slot out, whereby the metal is sheared through, i.e the metal is ruptured. A tube with such a prior-art slot is illustrated in FIG. 9 of the said U.S. Pat. No. 6,035,516.

To produce the slot of FIG. 9, the stamping operation has involved a punch moving in a radial direction relative to the tube. Attempts have been made to remove the metal, to form the slot, by means of a tool that is pushed into the tube axially, from the end of the tube, but the force necessary to do this has usually been too much for the punch, which has to be small enough to fit inside the tube.

In both cases, the slot-forming operation has been carried out before the tube has been attached to the top-rail. That being so, it was necessary, whether the tube is being welded or lock-beaded to the seatframe, to so arrange the holding jig as to ensure that the slot is orientated correctly.

Thus, the designer might prefer it, if the keyway in the headrest-mounting-tube could be made after the tube has been secured to the seatframe. Then, the production-line operator does not have to make sure the tube is correctly aligned as to its orientation.

Making the slot by shearing the metal, especially from inside the tube, can leave the sides of the slot jagged and sharp-edged. This can cause injuries to the operators. And not only that: often, the headrest post includes a plastic sleeve, and the orientation key is incorporated into the plastic moulding, and the operator engages the key into the slot by rotating and pressing down on the sleeve until the key drops in. (The top-end of the headrest-mounting-tube is not visible at this time, being below the level of the seat upholstery.) When the slot has sharp edges, plastic material might be shaved from the key, and the resulting looseness might lead to a rattle. Rattles in the headrest area are to be avoided.

Thus the designer might prefer it, if the keyway in the headrest-mounting-tube could be made without tearing or shearing the metal, and without leaving sharp edges.

A headrest-mounting-tube (like, for example, that shown in FIG. 9 of U.S. Pat. No. 6,035,516) is typically of welded steel tubing, having a wall thickness in the 1¼ or 1½ mm range, and a diameter in the 18 or 20 mm range. The slot shown therein was sheared out of the material of the tube, either from inside outwards, or from outside inwards, either of which can leave sharp edges. The slot was formed in the headrest-mounting-tube prior to the tube being installed in the seatframe.

It would have been advantageous, for assembly of the headrest-post into the tube, if the sharp edges could be de-burred, and especially if the corners of the slot could be chamfered. But such operations as these are generally quite expensive, not least because transfer of the tube to another processing facility would be required.

The invention is aimed at forming the keyway in the headrest-mounting-tube by a process which can be carried out after the tube has been attached into the top-rail of the seatframe, and which does not leave sharp edges.

GENERAL FEATURES OF THE INVENTION

In one of its aspects, the invention lies in a procedure for cold-forming the keyway in the upper-portion of the headrest-mounting-tube, which involves punching the tube, from the top-end thereof, in the axial sense, so as to create a keyway-pocket. Another aspect of the invention lies in a seatframe having the headrest-mounting-tube formed in that manner. One of the major advantages of the invention lies in the fact that the keyway-pocket forming operation can be carried out in the same jigs, and using very similar punch/die sets to the sets that would be already present for lock-beading the headrest-mounting-tubes into the seatframe.

On the other hand, the manner of forming the key-way-pocket as described herein can still be advantageously used, even when the operation of forming the keyway-pocket is carried out as a separate operation (which may be carried out in a separate factory) from the operation of attaching the headrest-mounting-tube into the seatframe.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
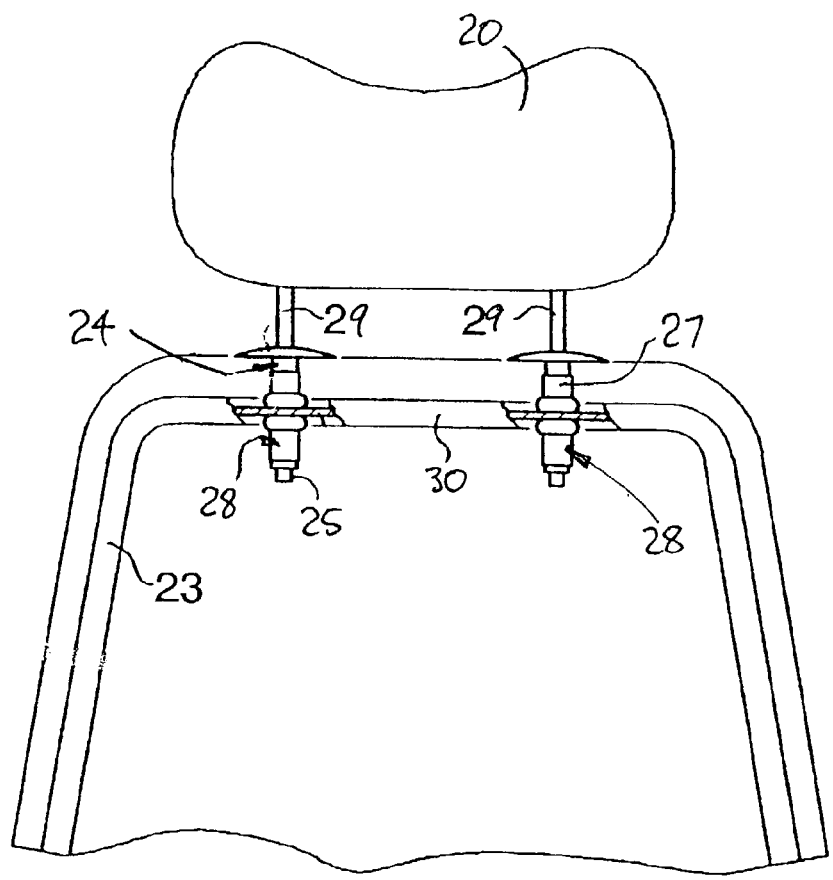
FIG. 1 shows part of an automotive seat, with a headrest. The headrest-mounting-tubes in the seatframe have keyway-pockets which incorporate the invention.

FIG. 1 shows the headrest 20 assembled to the seatframe 23. The left and right headrest-posts that support the headrest include respective moulded plastic sleeves 24, which have a springy barb 25 at the bottom end. The operator inserts the plastic sleeve 24 into the top-end 26 of the upper-portion 27 of the headrest-mounting-tube 28. When the sleeve 24 is fully home, the barb 25 snaps under the bottom end of the tube, whereby the sleeve is now locked against subsequent removal from the tube. The headrest-posts include spikes 29 attached to the headrest 20, which fit inside the sleeves 24, and the operator can insert the spikes 29 into and right through the sleeves 24, once the sleeves have been fully inserted into the tubes 28.

In some types of automotive seats, both sleeves 24 are the same, and are simply cylindrical, and then there is no need to hold the sleeves to a correct orientation within the mounting-tubes 28. In that case, no slots or keyways would be required in the mounting-tubes, and there would be no need for the invention, unless the designer prefers to hold the sleeve against rotation e.g for anti-rattle reasons.

But in other cases (especially, for example, where the headrest height-adjustment facility involves a hand-operated catch) the sleeves 24 must be correctly orientated, and the sleeves must be keyed to the headrest-mounting-tubes 28. The sleeve 24 has a key, which must be correctly orientated with the keyway in the headrest-mounting-tube 28, and the keyway in the headrest-mounting-tube must be correctly orientated with respect to the seatframe 23.

In many cases, the left and right sleeves 24 associated with the one headrest 20 are different; then, not only must the sleeves be correctly orientated, but it must be ensured that it is the left sleeve that is inserted into the left mounting-tube. This can generally be accomplished by providing two keys on one of the sleeves (and correspondingly two slots in the corresponding one of the mounting-tubes). It may even happen that all four sleeves for both the left seat and the right seat of the vehicle, are distinguished from each other, and then the keys and slots might have to be arranged so that each one of the four sleeves can only fit the correct one of four mounting-tubes.

It is important to ensure that the moulded plastic sleeves cannot be inserted wrongly. Once the plastic sleeves 24 have been inserted into the metal tubes 28, the sleeves really cannot be removed without taking the upholstery off the seatframe, and the seat out of the vehicle.

In FIG. 1, the headrest-mounting-tubes 28 are attached into the I-beam-section top-rail 30 of the seatframe 23 by lock-beading, as described in U.S. Pat. No. 6,035,516. The upper-portion 27 of each tube projects upwards from the top-rail 30. The upper-portion 27 is right-cylindrical, except for a keyway-pocket, as described below.

Figure 2:
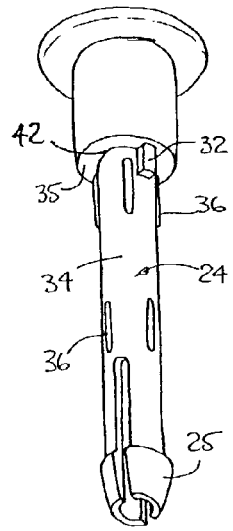
FIG. 2 is a pictorial view of a sleeve, being a component of a headrest-post of the seat of FIG. 1.

FIG. 2 shows the sleeve 24, and shows the key 32 moulded into the sleeve 24. The sleeve includes a hollow rod 34 surmounted by a shoulder 35. The rod 34 is dimensioned to be a snug sliding fit inside the mounting-tube 28. As mentioned, the headrest components must not rattle, and the rod may be moulded with ridges 36, which define the surface which actually touches the inside cylindrical surface of the tube. The ridges 36 fit tightly, but the plastic can distort enough that the grip they provide is not too tight. The shoulder 35 cannot enter the top-end 26 of the tube 28.

The rod 34 is of generally cylindrical configuration except that the rod includes the radially-protruding key 32, adjacent to the shoulder 35, which protrudes outwards from the generally cylindrical configuration of the rod.

Figure 3:
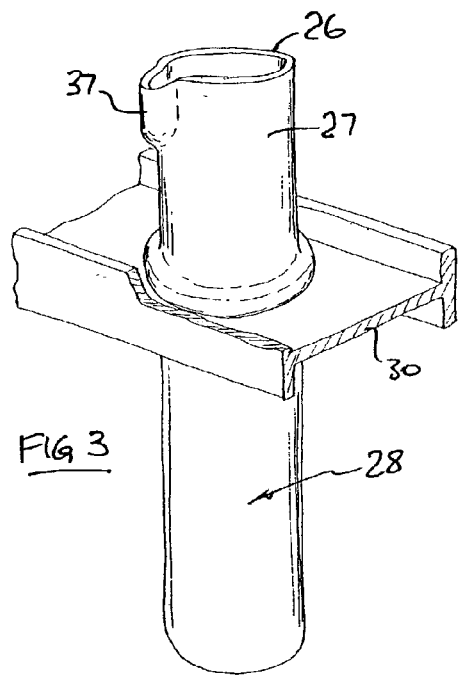
FIG. 3 is a perspective view of a headrest-mounting-post of the seat of FIG. 1, which includes a keyway-pocket.
Figure 4:
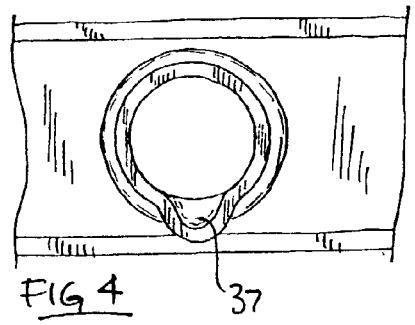
FIG. 4 is a plan view of the headrest-mounting-tube of FIG. 3.
Figure 5:
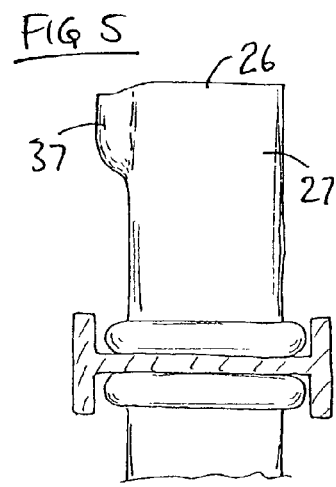
FIG. 5 is a side view of the headrest-mounting-tube of FIG. 3.

The keyway-pocket 37 in the headrest-mounting-tube 28 is shown in FIGS. 3,4,5. The keyway-pocket 37 is designed to suit the key 32. The rod 34 of the sleeve 24 can enter the headrest-mounting-tube 28 through the top-end 26 of the upper-portion 27, and the shoulder 35 can rest against the top-end 26 if, but only if, the rod is so orientated that the key 32 can enter the keyway-pocket 37. That is to say, the shoulder 35 cannot rest against the top-end 26 unless the sleeve 24 is so orientated that the key 32 can enter the keyway-pocket 37.

Figure 4A:
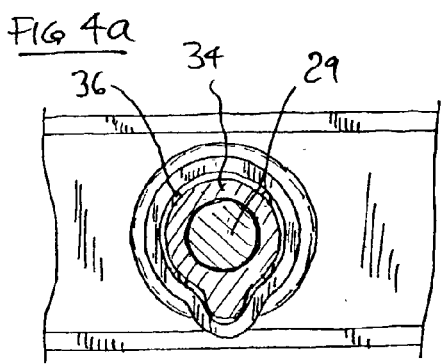
FIG. 4a is the same view as FIG. 4, but includes the headrest-post sleeve of FIG. 2.

FIG. 4a is a plan view, and shows the manner of engagement of the sleeve 24, with its key 32, into the mounting-tube 28, with its keyway-pocket 37. It may be noted that the sides of the prior art sheared-through slot were parallel; therefore, the sides of the key, in that case, had to be complementarily parallel. In FIG. 4, the sides of the key-way pocket need not be, and preferably are not, parallel; correspondingly, the key 32 need not be parallel, but may be of a (preferred) more rounded form, as shown.

Since the key 32 of the sleeve 24 has to be orientated correctly relative to the seatframe 23, so, naturally, the keyway-pocket 37 in the mounting-tube 28 has to be orientated correctly relative to the seatframe. It would be possible to put the keyway-pocket into the tube 28 prior to the tube being lock-beaded into the top-rail 30 of the seatframe, but it is much preferred not to make the keyway-pocket in the tube until after the tube has been lock-beaded into the seatframe. That way, the keyway-pocket is automatically correctly orientated relative to the seatframe. If the keyway-pocket were formed in the headrest-tube prior to the headrest-tube being inserted into the seatframe, of course that would restrict how the headrest-tube could later be inserted into the seatframe—a restriction that did not occur when the keyway was provided as a slot cut in the tube.

It may be noted that the operation of lock-beading the headrest-mounting-tube into the top-rail of the seatframe (see U.S. Pat. No. 6,035,516) is carried out by applying axial force to the top-end of the upper-portion of the headrest-mounting-tube. The operation of forming the keyway-pocket 37 may also be carried out by applying axial force to the top-end 26 of the upper-portion 27 of the headrest-mounting-tube 28. In fact, the two operations can be combined. The jig in which the seatframe 23 has to be mounted for the lock-beading operation will serve also to hold the seatframe for the keyway forming operation.

The operation of lock-beading the headrest-mounting-tube 28 to the seatframe 23 involves clamping the tube in a die, while the seatframe is carried on a jig, and requires the use of a plurality of punches. It may be noted that making the keyway-pocket 37 is compatible with this procedure. The keyway-pocket may be formed using simply another punch in the magazine of punches that is already present for carrying out the lock-beading operation.

Thus, the prior art sheared-through slot, which was a troublesome and costly element of the design, has been replaced by the keyway-pocket 37, which has no jagged edges, is of a more or less ideal shape, and costs virtually nothing.

Figure 6:
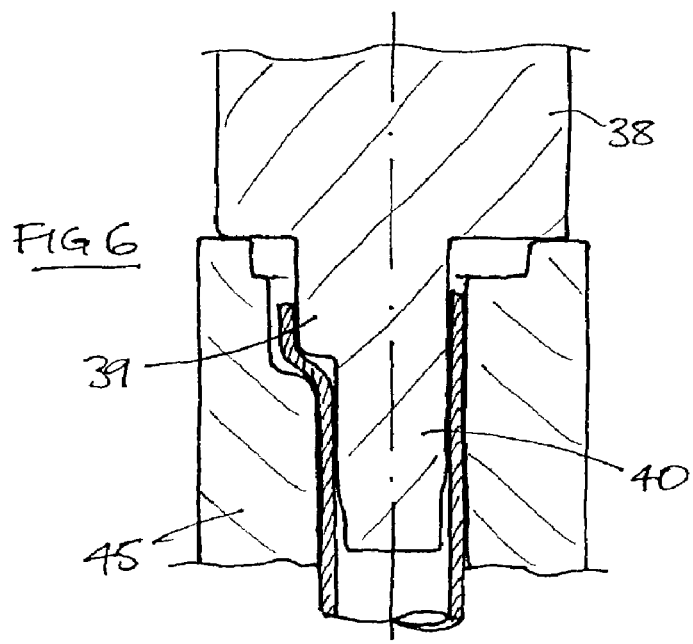
FIG. 6 is a diagrammatic representation of a punch and die set, as used for forming the keyway-pocket of FIG. 3.
Figure 7:
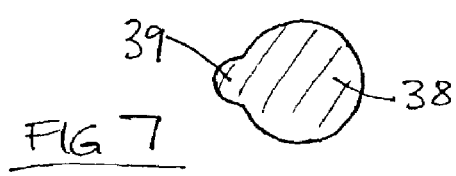
FIG. 7 is a plan view of the punch of FIG. 6.

The punch and die for making the keyway-pocket are shown in FIG. 6. The punch 38 is generally cylindrical, being sized to pass inside the top end of the upper portion of the headrest-mounting-tube. The punch includes a key-form 39, which protrudes radially (FIG. 7). The key-form 39 does not extend all the way down the punch; that is to say, the punch 38 has a bottom portion 40 which is completely right-cylindrical. This bottom portion 40 ensures that the mounting-tube 28 remains properly centred on the punch. Besides, if the keyway-pocket were to be taken right down to the lock-bead (34 in FIG. 5 of U.S. Pat. No. 6,035,516), that might damage the lock-bead. In any case, the key and keyway only need a small axial length to be strong enough to hold the headrest-post in its correct orientation.

The die 45 is in two halves, which can be operated to clamp around the upper-portion 27 of the headrest-mounting-tube. In cases where the length of the upper-portion is too short to enable an adequate clamping grip from the die halves, the die can be arranged to clamp on the lower-portion of the tube, i.e the portion of the tube that lies underneath the top-rail 30. Or, the die may be arranged to clamp onto both the upper-portion as well as onto the lower portion of the tube, around the top-rail, though this makes the die rather complicated. But it is so advantageous to form the keyway-pocket after the headrest-mounting-tube has been lock-beaded into the seatframe, as to be worth a little complication in the arrangement of the die.

As will be noted in FIGS. 3,5, the top of the keyway-pocket 37 is, like a spout, slightly lower than the top-end 26. This is because the metal gets pulled down during the pocket-punching operation. However, the effect is beneficial, because it allows a generous radius at 42 (FIG. 2) of the plastic moulding. The spout-like keyway-pocket 37 is characterised by smooth transitions, and generous radiuses and chamfers, both circumferentially and axially, in respect both of the pocket itself, and complementarily of the key in the headrest-post.

Figure 8:
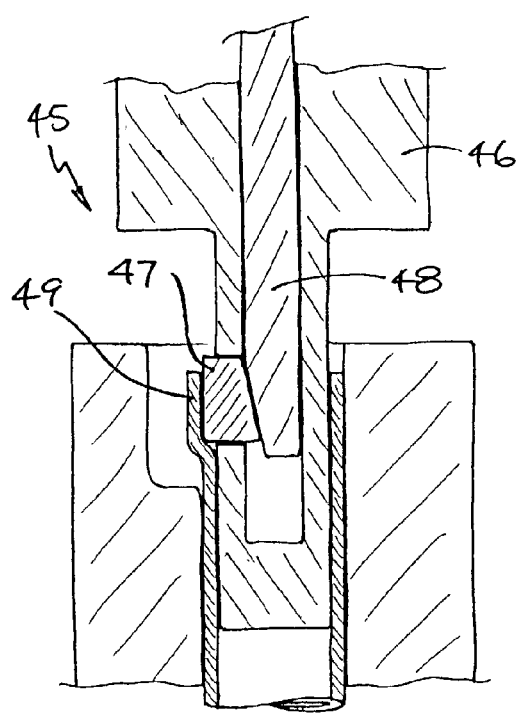
FIG. 8 is a diagrammatic representation of another punch and die set, as used for forming another keyway-pocket.

But sometimes, the designer might wish to avoid the pulled-down or spout-mouth appearance. In that case, the keyway pocket may be formed, not by pushing axially, but by pushing outwards from inside the headrest-mounting-tube. FIG. 8 shows how the tooling may be arranged, to accomplish this. The punch assembly 45 includes a body 46, a tappet 47, and a wedge 48. The whole punch assembly 45 can move as one, or the wedge 48 can be driven downwards while the body 46 remains stationary. This forces the tappet 47 outwards by wedge action, creating the pocket 49. The wedge 48 is separately actuated only after the punch assembly 45 has been inserted fully into the headrest-mounting-tube. As a result, the drawing-down of the top of the pocket can be eliminated; or at least it can be much reduced, compared with the spout as in FIG. 3, which happens when the pocket is formed with a solely axial punch.

Figure 9:
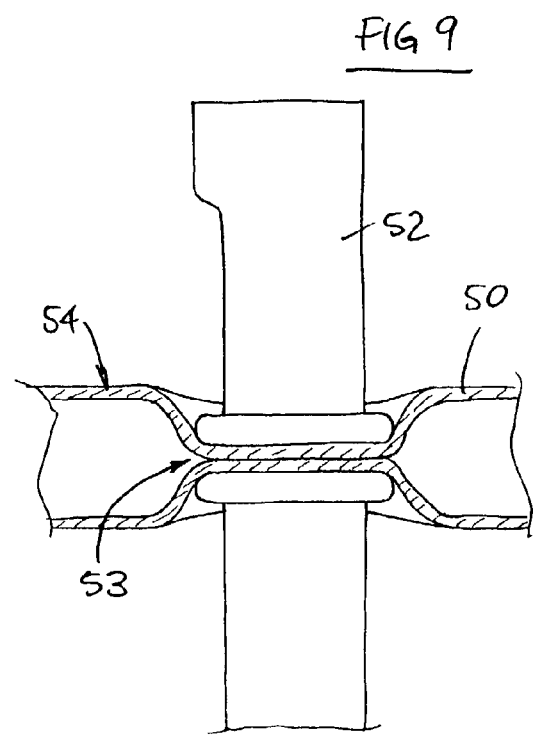
FIG. 9 is a view similar to that of FIG. 5, except for the form of the seatframe.

In the previous drawings, the seatframe has been illustrated as of an I-beam section. Such a section, as shown, may be provided as an aluminum extrusion. FIG. 9 shows a seatframe that is provided in the form of a hollow steel tube 50. The headrest-mounting-tube 52 is lock-beaded into the seatframe tube 50, in the manner as depicted for example in FIGS. 6–10 of the said U.S. Pat. No. 6,035,516.

Comparing the seatframe tube 50 of FIG. 9 with the I-beam seatframe 30 of FIG. 3, above, it may be regarded that the squashed-flat region 53 of the seatframe tube 50 is equivalent to the web of the I-beam, and the surrounding un-compressed regions 54 of the seatframe tube 50 are equivalent to the flanges of the I-beam.

In a lock-beaded joint, two ring-beads are provided on the headrest-mounting-tube, one to each side of the web of the seatframe. As shown in FIG. 9 of '516, the first ring-bead was pre-formed into the headrest-mounting-tube, before the headrest-mounting-tube was assembled into the through-hole in the seatframe; but the designer may prefer that both ring-beads be formed after the headrest-mounting-tube has been inserted into the through-hole.

In an alternative construction, the metal headrest-mounting-tube is secured into the top-rail of the seatframe, not by lock-beading, but by welding. The keyway-pocket may, in that case, be formed (by axial punching) after the headrest-mounting-tube has been welded to the top-rail. However, in cases where the headrest-mounting-tube is secured by welding, the designer will generally prefer that the keyway-pockets be pre-formed into the headrest-mounting-tubes, as a preliminary press operation, before the operation of attaching the headrest-mounting-tube to the top-rail.

The invention claimed is:

1. A seatframe for an automotive seat, having a top-rail, and having a headrest-mounting-tube secured to the top-rail, wherein:
   the headrest-mounting-tube is of metal;
   the headrest-mounting-tube has an upper-portion, which protrudes from the top-rail and which terminates in an open top-end;
   the upper-portion is of generally cylindrical configuration, except that the upper-portion has been formed, at the top-end thereof, with a keyway-pocket;
   the keyway-pocket comprises a local distortion of the metal of the headrest-mounting-tube, the metal having yielded, and having been distorted radially outwards from the cylindrical configuration of the upper-portion, to form a pocket;
   the nature of the said local distortion is such that, over at least most of the depth of the keyway-pocket, the metal forming the keyway-pocket is unbroken;
   the headrest-mounting-tube is suitable for receiving therein a headrest-post, being a headrest-post having the following characteristics:
      (a) that the headrest-post includes a rod;
      (b) that the dimensions of the rod are such that the rod can enter the top-end of the upper-portion of the headrest-mounting-tube;
      (c) that the rod is of generally cylindrical configuration except that the rod includes a radially-protruding key, which protrudes outwards from the generally cylindrical configuration of the rod;
      (d) that the key can fit into the keyway-pocket;
      (e) that the rod can enter the headrest-mounting-tube through the top-end of the upper-portion, and can pass down the headrest-mounting-tube to a depth D if the rod is so orientated that the key can enter the keyway-pocket, but the rod can pass down only to a lesser depth unless the rod is so orientated that the key can enter the keyway-pocket;

the structure of the headrest-mounting-tube is such that the said headrest-post can enter the headrest-mounting-tube through the top-end of the upper-portion, and can pass down to the depth D if the rod is so orientated that the key can enter the keyway-pocket, but the rod can pass down only to a lesser depth unless the rod is so orientated that the key can enter the keyway-pocket.

2. A seatframe for an automotive seat, having a top-rail, and having a headrest-mounting-tube secured to the top-rail, wherein:
   the headrest-mounting-tube is of metal;
   the headrest-mounting-tube has an upper-portion, which protrudes from the top-rail and which terminates in an open top-end;
   the upper-portion is of generally cylindrical configuration, except that the upper-portion has been formed, at the top-end thereof, with a keyway-pocket;
   the keyway-pocket comprises a local distortion of the metal of the headrest-mounting-tube, the metal having yielded, and having been distorted radially outwards from the cylindrical configuration of the upper-portion, to form a pocket;
   the nature of the said local distortion is such that, over at least most of the depth of the keyway-pocket, the metal forming the keyway-pocket is unbroken;
   the headrest-mounting-tube is suitable for receiving therein a headrest-post, being a headrest-post having the following characteristics:
      (a) that the headrest-post comprises a rod surmounted by a shoulder;
      (b) that the dimensions of the rod and of the shoulder are such that the rod can enter the top-end of the upper-portion of the headrest-mounting-tube, but the shoulder cannot;
      (c) that the rod is of generally cylindrical configuration except that the rod includes a radially-protruding key, adjacent to the shoulder, which protrudes outwards with respect to the generally cylindrical configuration of the rod;
      (d) that the key can fit into the keyway-pocket;
      (e) that the rod can enter the headrest-mounting-tube through the top-end of the upper-portion, and the shoulder can rest against the top-end if the rod is so orientated that the key can enter the keyway-pocket, but the shoulder cannot rest against the top-end unless the rod is so orientated that the key can enter the keyway-pocket;
   the structure of the headrest-mounting-tube is such that the said headrest-post can enter the headrest-mounting-tube through the top-end of the upper-portion, and the shoulder can rest against the top-end if the rod is so orientated that the key can enter the keyway-pocket, but the shoulder cannot rest against the top-end unless the rod is so orientated that the key can enter the keyway-pocket.

3. Seatframe of claim 2, in combination with a headrest-post, wherein:
   the headrest-post includes a rod surmounted by a shoulder;
   the dimensions of the rod and of the shoulder are such that the rod can enter the upper-portion of the headrest-mounting-tube, but the shoulder cannot;
   the rod is of generally cylindrical configuration except that the rod includes a radially-protruding key, adjacent to the shoulder, which protrudes outwards from the generally cylindrical configuration of the rod;
   the key and the keyway-pocket are so configured that the key can fit into the keyway-pocket;
   the rod can enter the headrest-mounting-tube through the top-end of the upper-portion, and the shoulder can rest against the top-end if the rod is so orientated that the key can enter the keyway-pocket, but the shoulder cannot rest against the top-end unless the rod is so orientated that the key can enter the keyway-pocket;
   the rod of the headrest-post lies entered in the upper-portion of the headrest-mounting-tube, and the key lies entered in the keyway-pocket, and the shoulder rests against the top-end of the headrest-mounting-tube.

4. Combination of claim 3, wherein:
   the headrest-post includes a plastic-moulded hollow sleeve;
   the combination includes a means for locking the sleeve into the headrest-mounting-tube, automatically upon the sleeve being fully inserted into the headrest-mounting-tube;
   the headrest-post includes a spike which resides inside the hollow sleeve;
   the combination includes a headrest, and the spike is mechanically unitary with the headrest.

5. Combination of claim 2, wherein:
   except for the keyway-pocket, the upper portion comprises right-cylindrical walls;
   the rod has ridges, which protrude outwards with respect to the generally cylindrical configuration of the rod, and the ridges engage the inside of the said walls.

6. Seatframe of claim 2, wherein the key-way pocket is open, in an axial sense, at the top-end of the upper-portion of the headrest-mounting-tube, for receiving the key on the rod, when the rod is inserted axially into the upper-portion through the top-end.

7. Seatframe of claim 2, wherein the seatframe is one in which the said local distortion was carried out before the headrest-mounting-tube was secured into the top-rail.

8. Seatframe of claim 2, wherein the seatframe is one in which the said local distortion was carried out after the headrest-mounting-tube was secured to the top-rail.

* * * * *